(12) United States Patent
Daniel et al.

(10) Patent No.: US 6,898,986 B2
(45) Date of Patent: May 31, 2005

(54) METER FOR THE MEASUREMENT OF MULTIPHASE FLUIDS AND WET GAS

(75) Inventors: Paul Richard Daniel, Sunderland (GB); Jonathan Stuart Lund, Ashby-de-la Zouch (GB)

(73) Assignees: Lattice Intellectual Property Limited, London (GB); ISA Controls Ltd., Shildon (GB)

( * ) Notice: Subject to any disclaimer, the term of this patent is extended or adjusted under 35 U.S.C. 154(b) by 0 days.

(21) Appl. No.: 10/333,218

(22) PCT Filed: Jul. 19, 2001

(86) PCT No.: PCT/GB01/03156

§ 371 (c)(1),
(2), (4) Date: Jun. 23, 2003

(87) PCT Pub. No.: WO02/08702

PCT Pub. Date: Jan. 31, 2002

(65) Prior Publication Data

US 2004/0011139 A1 Jan. 22, 2004

(30) Foreign Application Priority Data

Jul. 21, 2000 (GB) ............................................. 0017840

(51) Int. Cl.⁷ ................................................. G01F 1/44
(52) U.S. Cl. ................................................... 73/861.63
(58) Field of Search ......................... 73/861.04, 861.63, 73/861.02

(56) References Cited

U.S. PATENT DOCUMENTS

| 4,856,344 A | * | 8/1989 | Hunt ....................... 73/861.04 |
| 5,551,305 A | * | 9/1996 | Farchi et al. ............ 73/861.04 |
| 5,597,961 A | * | 1/1997 | Marrelli ................... 73/861.04 |

FOREIGN PATENT DOCUMENTS

| EP | 0 684 458 | 11/1995 |
| WO | 99 56091 | 11/1999 |

* cited by examiner

*Primary Examiner*—Edward Lefkowitz
*Assistant Examiner*—Jewel V. Thompson
(74) *Attorney, Agent, or Firm*—Oblon, Spivak, McClelland, Maier & Neustadt, P.C.

(57) ABSTRACT

A meter for the measurement of the gas mass flow rate and total liquid mass flow rate of a two phase or multiphase fluid is disclosed. The meter comprises a series of three flow element, the firs element is arranged to mix fluids passing therethrough and the second and third elements are each arranged to provide a measurement of the differential pressure across that element. The second and third elements may be added to an existing installation with an element capable of performing mixing, after the mixing element. The second and third elements provide independent measurements by having different configurations presented to the fluids passing therethrough. The first and third elements may comprise conduits with internal projections and the second element may be a venturi. A flow element for use in such a meter is also disclosed.

18 Claims, 2 Drawing Sheets

METER FOR THE MEASUREMENT OF MULTIPHASE FLUIDS AND WET GAS

This application is a 371 of PCT/Gbo1/03156 Jul. 19, 2001.

BACKGROUND OF THE INVENTION (1) Field of the Invention

This invention relates to flow meters to measure the gas and total liquid mass flow rates of a two phase of multiphase fluid.

(2) Description of Related Art

Hydrocarbon fluids produced from wells consist of a mixture of gaseous hydrocarbons, liquid hydrocarbons and water. It is desirable to meter these hydrocarbon fuels in their so-called two-phase state where the term two phase is taken to mean that the fluid consists of both a gas phase and a liquid phase. The liquid phase can be made up of two or more constituents, typically oil and water. Where the volume of gas is high with respect to the volume of liquid the multiphase well fluid is often referred to as wet gas.

Methods and apparatuses for measuring multiphase flow are known. For example WO 99/56091 discloses a method of measuring a gas mass fraction in a mass of liquid and gas flowing along a pipeline. The method includes providing a flow conditioner to create a uniform mixture of gas and liquid and a venturi positioned downstream from the flow conditioner. By measuring differential pressures at points across and/or between the two flow elements the gas mass fraction of the liquid and gas flow may be determined.

BRIEF SUMMARY OF THE INVENTION

According to a first aspect of the present invention there is provided a meter for measurement of multiphase fluids comprising a series of at least three flow elements. The first of the three elements is preferably arranged to mix fluids passing therethrough and the second and third elements are preferably differential pressure based flow measuring devices. The second and third elements may be provided after an existing first element which can perform a sufficient degree of mixing. The differential pressure based flow measuring devices are preferably configured to provide measurements that are independent of each other. Each of the flow elements may create some form of pressure drop along its length. The first and third elements preferably have an internal geometry which may be formed by one or more internal projections and the second element preferably includes a venturi.

Preferred examples of the first aspect of the present invention have been demonstrated to provide highly accurate and consistent measurements of both gas and liquid flow rates using measurements of pressure or differential pressure. The accurate and consistent measurements are maintained even at medium, high and very high gas void fractions.

According to a second aspect of the present invention there is provided a flow element comprising a conduit having at least two projections therein. The flow element preferably has two projections which project inwardly from substantially opposite inner surfaces of the flow element. The projections are preferably staggered along an axial length of the conduit. Such a flow element thoroughly mixes and homogenises mixtures of fluids passing therethrough. A differential pressure may be measured across the flow element.

BRIEF DESCRIPTION OF THE DRAWINGS

Each aspect of the invention will now be further described by way of example, with reference to the accompanying drawings, in which.

DETAILED DESCRIPTION OF THE INVENTION

Figure 1:
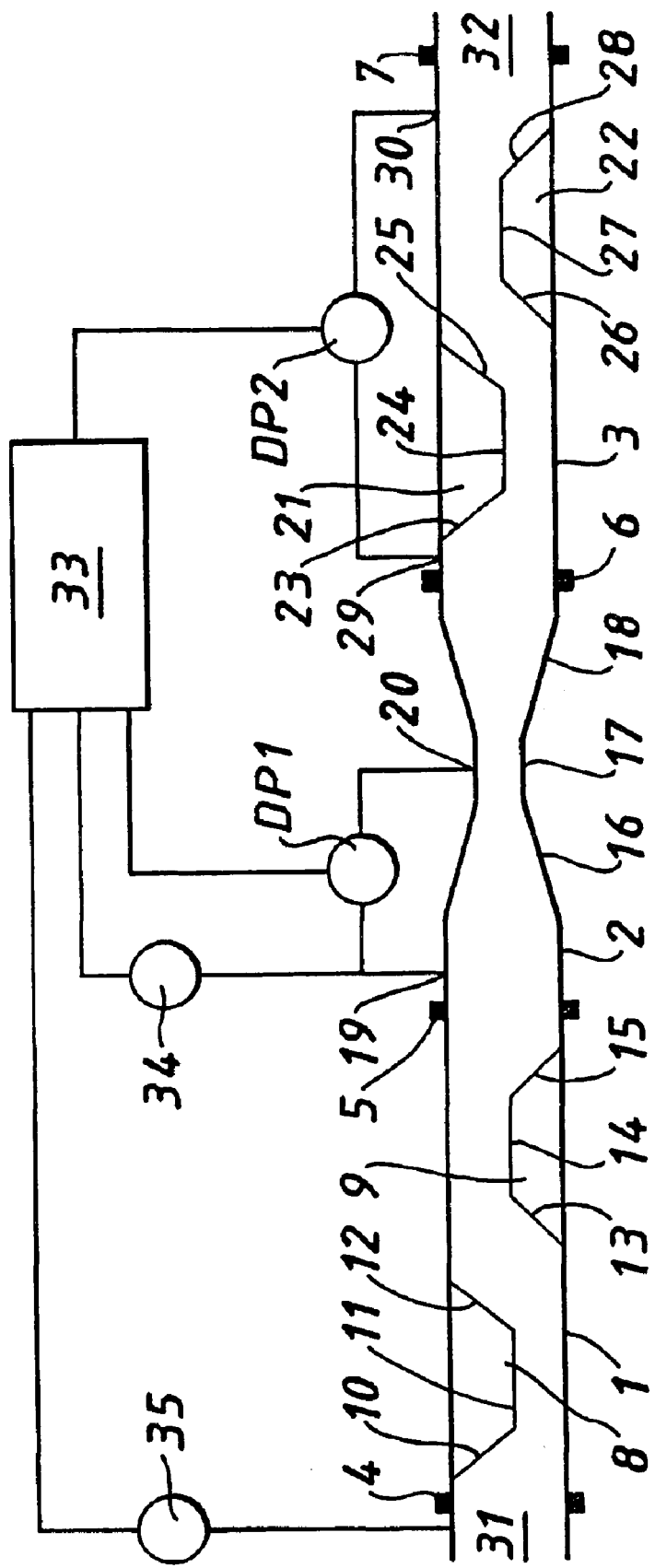
FIG. 1 diagrammatically shows a meter for measurement of two phase or multiphase fluids and FIG. 2 shows a slot element which can be used as one of the flow elements.

An example of a flow-measuring device illustrating this invention is shown in FIG. 1. This device consists of three substantially cylindrical flow elements (1, 2, 3) connected in series in this case by means of flanges (5, 6). Within the first element (1) are two wedges (8, 9) projecting toward the bore axis. Each wedge (8, 9) has a first surface (10, 13) oriented obliquely to the bore and generally facing the upstream end of the meter (31), a second surface (11, 14) that runs parallel with the bore axis and a third surface (12, 15) oriented obliquely to the bore and generally facing the downstream end of the meter (32). A given wedge (8, 9) has a substantially semi-cylindrical peripheral surface, the curved portion of which conforms to the cylindrical inner wall of the bore. In this example the two wedges (8, 9) are staggered and located such that the upstream wedge (8) is at the top of the cylindrical bore, and the downstream wedge (9) is at the bottom of the bore. There is a gap between the upstream surface (13) of the downstream wedge (9) and the downstream surface (12) of the upstream wedge (8) to enable the wedges to protrude by more than 50% of the cross section of the bore without totally inhibiting the flow.

The second element (2) is a well-known venturi. This element is substantially cylindrical and consists of a convergent section (16), a 'throat' section (17) and a divergent section (18). A pressure tapping (19) upstream of the convergent section (16) and a further pressure tapping (20) in the throat section (17) allow a differential pressure measurement (DP1) to be made.

The third element of the meter (3) is similar in design to the first element (1) and includes two wedges (21, 22). Each wedge (21, 22) has a first surface (23, 26) oriented obliquely to the bore and generally facing the upstream end of the meter (31), a second surface (24, 27) that runs parallel with the bore axis and a third surface (25, 28) oriented obliquely to the bore and generally facing the downstream end of the meter (32). A given wedge (21, 22) has a substantially semi-cylindrical peripheral surface, the curved portion of which conforms to the cylindrical inner wall of the bore. In this example the two wedges (21, 22) are staggered and located such that the upstream wedge (21) is at the top of the cylindrical bore, and the downstream wedge (22) is at the bottom of the bore. There is a gap between the upstream surface (26) of the downstream wedge (22) and the downstream surface (25) of the upstream wedge (21) to enable the wedges to protrude by more than 50% of the cross section of the bore without totally inhibiting the flow. Element three (3) differs from element one (1) in that two tappings are made in the body (29, 30), one tapping (29) before the upstream wedge (21) and one tapping (30) after the downstream wedge (22). These tappings (29, 30) facilitate the measurement of the differential pressure (DP2) across element three (3) of the meter.

In the present example all the tappings (19, 20, 29, 30) are located at substantially the uppermost position and are taken vertically upwards to the pressure measuring devices (DP1, DP2, 34). The meter, consisting of the three flow elements (1, 2, 3), is connected in to a pipe line usually by means of flanges (4, 7) with the flow direction flowing from the upstream end (31) to the downstream end (32). The meter should preferentially be orientated in the horizontal position. A measurement of the upstream pressure (34) should also be taken along with a reading of the fluid temperature (35).

The differential pressure, upstream pressure and temperature measurements (DP1, DP2, 34, 35) are fed back to a processing element (33) that contains the algorithms to compute the gas and liquid flows and also possibly an annunciation of flow rates and process conditions. These algorithms are described later. Alternatively the processing element (33) can use look-up tables to determine the gas and liquid flows from the measurements.

The role of flow element one (1) is one of mixing. In multiphase flow at high gas volume fractions it is usual for the gas to travel along the centre of the pipe at a much higher velocity than the liquid, which tends to adhere to the wall.

Alternatively, it is also common for the majority of the liquid to flow along the bottom of the pipe at a much lower velocity than the gas above it. The difference between the in-situ velocities is often termed slip. The wedges (8, 9) of flow element one (1) cause the liquid to be drawn off the wall or from the bottom of the pipe and into the gas flow. This creates a mixing that is key to the performance of the second and third flow elements two and three (2, 3) of the meter.

The second and third flow elements (2, 3) of the meter are differential pressure based flow measuring devices. It is important that the configuration of these two differential pressure elements is such that independent measurements are provided. This means that the elements must behave differently in the presence of liquid.

The gas and liquid flow rates may be derived in the following manner:

First the mass flow rate is measured from the second and third elements under the assumption of single phase, dry gas conditions.

$$Q_{ma} = \frac{C_a}{\sqrt{1-\beta_a^4}} \varepsilon \frac{\pi}{4} d_a^2 \sqrt{2\Delta P_a \rho_g},$$

$$Q_{mb} = \frac{C_b}{\sqrt{1-\beta_b^4}} \varepsilon \frac{\pi}{4} d_b^2 \sqrt{2\Delta P_b \rho_g}.$$

C is the discharge coefficient, d the effective restriction diameter, $\Delta P$ the differential pressure, $\rho$ the gas density, $\beta$ the ratio of d to the pipe diameter and the subscripts a and b denote element two and three respectively.

The presence of liquid in the fluid stream causes the measured flow rates, $Q_{ma}$ and $Q_{mb}$, to be larger than the true gas mass flow rate, $Q_{gc}$. This overread can be related to the Martinelli parameter X as, $$X = \frac{1-x}{x}\sqrt{\frac{\rho_g}{\rho_l}},$$

where, x is the gas mass fraction, often termed quality when related to steam, $\rho$ is the density, where the subscripts g and l denote gas and liquid respectively.

The relationship between overread and Martinelli parameter may be expressed, $$\frac{Q_m}{Q_{gc}} - 1 = M\frac{(1-x)}{x}\sqrt{\frac{\rho_g}{\rho_l}} + c.$$

Provided there is sufficient demarcation between the two DP elements (2, 3) with respect to the constant M then two independent equations relating $Q_m$ and x to $Q_{gc}$ exist, $$Q_{gc} = \frac{Q_{ma}}{1 + c_a + M_a\frac{(1-x)}{x}\sqrt{\frac{\rho_g}{\rho_l}}} = \frac{Q_{mb}}{1 + c_b + M_b\frac{(1-x)}{x}\sqrt{\frac{\rho_g}{\rho_l}}}.$$

Solving for the gas mass fraction or quality, x, yields, $$x = \frac{r_\rho(r_Q M_a - M_b)}{(1 + c_b - M_b r_\rho) - r_Q(1 + c_a - M_a r_\rho)}$$

where $$r_Q = \frac{Q_{mb}}{Q_{ma}}$$

ratio of measured flows under the assumption of single phase gas flow.

$$r_\rho = \sqrt{\frac{\rho_g}{\rho_l}}$$

square root of the ratio of the density of gas to liquid.

Once the quality or gas mass fraction has been ascertained then the gas mass flow rate may be calculated, $$Q_{gc} = \frac{Q_{ma}}{1 + c_a + M_a\frac{(1-x)}{x}\sqrt{\frac{\rho_g}{\rho_l}}}.$$

Finally with a knowledge of the gas mass flow rate and the gas mass fraction the liquid mass flow rate is calculated, $$Q_l = \frac{Q_{gc}(1-x)}{x}.$$

The geometry of the upstream mixing flow element (1) and the third flow element (3) are key factors in providing an accurate measurement of both liquid and gas. The first element (1) upstream mixer is particularly important in that it maintains a predictable relationship between the Martinelli parameter and the particular meter element overread for both DP elements (2,3). The unique internal geometry of the third element (3) ensures that this relationship is significantly different from the second element (2) to allow satisfactory resolution of the gas mass fraction equation.

Figure 2:
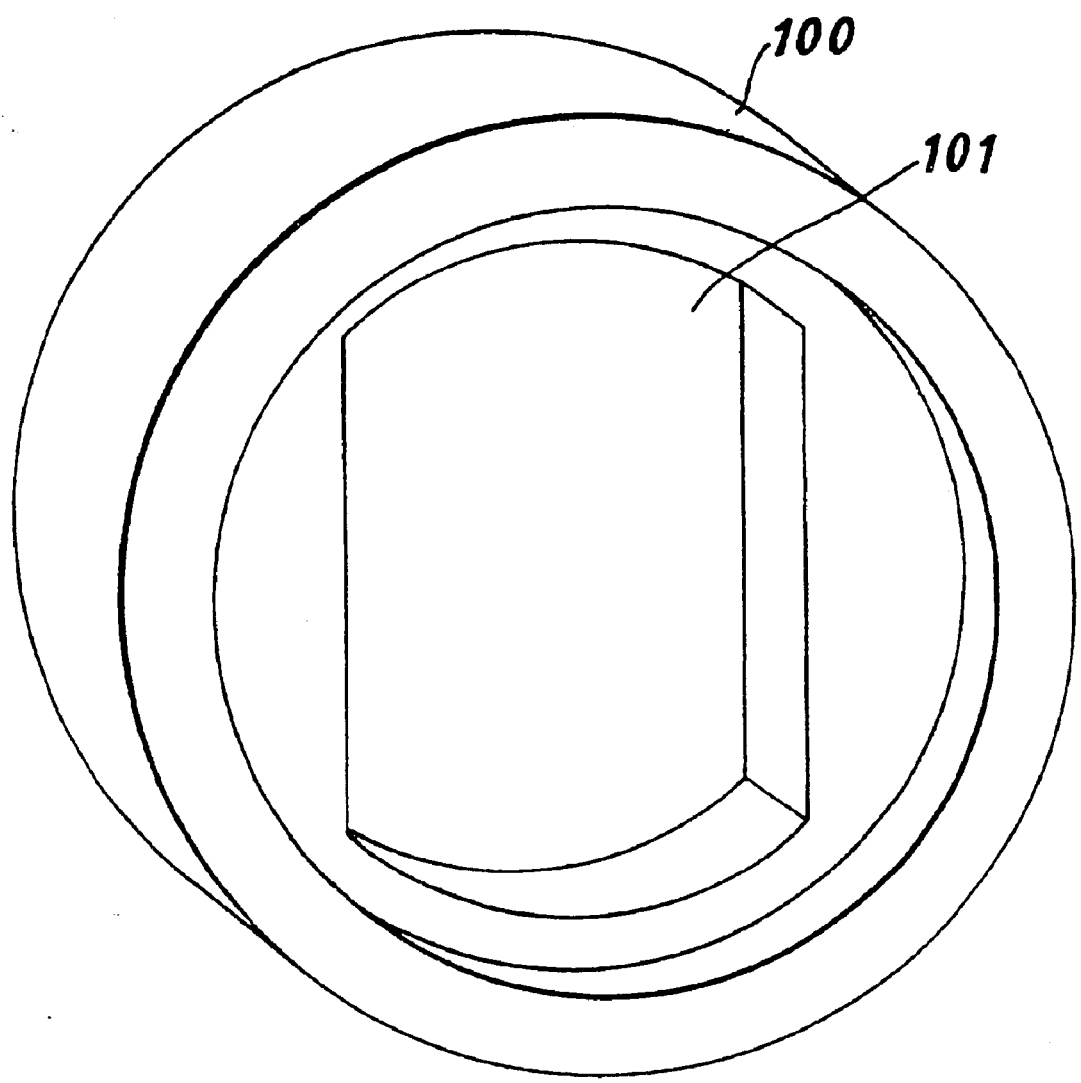

The first element, thoroughly mixes and homogenises the flow. The example shown in FIG. 1 shows the first element comprising a specially developed internal double wedge geometry. However, any flow mixer or flow homogeniser will be suitable as the first element such as a mixer plate for example. The second and third elements each have a differential pressure measurement taken across them. The second and third elements behave differently in the presence of fluid to produce a substantially different relationship to liquid flow from each other so that independent differential pressure measurements are provided. This is achieved by the second and third flow elements presenting different configurations to the fluids flowing therethrough. The example of FIG. 1 shows a venturi as the second element and a double wedge arrangement as the third element. However any two elements which present different configurations to the fluids flowing therethrough so that independent differential pressure measurements are obtained will be suitable. For example as well as the venturi and double wedge mentioned above, a slot element such as the example shown in FIG. 2 could be used instead of either the venturi or double wedge. The slot is machined into in a solid bar (100) of material of similar diameter to the meter spool. The machined slot (101) runs axially through the bar (100) having a symmetrical cross section in the shape of a rectangle or a letter O with concentric curved faces top and bottom and parallel vertical faces on each side. Furthermore the two differential pressure measuring elements may be in any order.

If an existing installation for the passage of two phase or multiphase fluid has an element capable of providing mixing, such as a blind T installation, then the invention could be provided by the inclusion of two flow elements, each having means to measure the differential pressure of the fluid passing through that element, included downstream of the mixing element.

With this unique arrangement it has been demonstrated that highly accurate and consistent measurements of both gas and liquid can be obtained at various gas void fractions from 91% to 99.5% but could be suitable for a wider range of gas fractions.

What is claimed is:

1. A meter for measuring a gas mass flow rate and a total liquid mass flow rate of a two phase or multiphase fluid, comprising:

a first flow element arranged to mix or homogenise fluids passing therethrough; and second and third elements arranged to be positioned downstream of the first flow element, each of the second and third elements comprising means for altering the flow pattern of fluids passing therethrough and means for providing an indication of a differential pressure of the fluids passing through that element.

2. The meter according to claim 1, wherein the second flow element is arranged downstream of the first flow element and the third flow element is arranged downstream of the second flow element.

3. The meter according to claim 1, wherein the second and third flow elements have different internal configurations, thereby differently altering the flow pattern of fluids flowing therethrough.

4. The meter according to claim 3, wherein independent differential pressure measurements are provided by each of the second and third flow elements.

5. The meter according to claim 3, wherein each of the second and third flow elements is arranged to create a pressure drop to the fluids passing therethrough.

6. The meter according to claim 1, wherein at least one of the flow elements comprises a conduit having one or more internal projections therein.

7. The meter according to claim 6, wherein the conduit has two projections which project inwardly from substantially opposite points on an inner surface of the conduit.

8. The meter according to claim 7, wherein the projections are staggered along an axial length of the conduit.

9. The meter according to claim 6, wherein the first flow element and one of the second and third flow elements each comprise a conduit having one or more internal projections therein and the other flow element comprises a venturi.

10. The meter according to claim 1 including a processing element which is arranged to receive signals indicative of differential pressure measurements of the fluid passing through each of the second and third flow elements and to determine the gas mass flow rate and total liquid mass flow rate of the fluid based on the received signals.

11. The meter according to claim 10, wherein a pressure sensor is provided to measure the upstream pressure of fluid passing through the meter and the processing element is arranged to receive a signal indicative of a pressure measurement from the pressure sensor to be used in determining the gas mass flow rate and total liquid mass flow rate of the fluid.

12. The meter according to claim 10, wherein a temperature sensor is provided to measure the temperature of fluid passing through the meter and the processing element is arranged to receive a signal indicative of a temperature measurement from the temperature sensor to be used in determining the gas mass flow rate and total liquid mass flow rate of the fluid.

13. The meter according to claim 10, wherein the processing element is arranged to determine the gas mass flow rate and total liquid mass flow rate of the fluid using algorithms.

14. The meter according to claim 10, wherein the processing element is arranged to determine the gas mass flow rate and total liquid mass flow rate of the fluid using a look-up table.

15. A method of measuring a gas mass glow rate and a total liquid mass flow rate of a two phase or multiphase fluid, comprising:

mixing or homogenizing the two phase or multiphase fluid by passing it through a first flow element;

passing the mixed or homogenized fluid through a second flow element, the second flow element comprising means for altering the flow pattern of fluids passing therethrough, measuring the differential pressure across the second flow element;

passing the fluid through a third flow element, the second flow element comprising means for altering the flow pattern of fluids passing therethrough;

measuring the differential pressure across the third flow element; and determining either or both of the gas mass flow rate and the liquid mass flow rate of the two phase or multiphase fluid based on the differential pressures measured across the second and third flow elements.

16. The method according to claim 15, wherein the second and third flow elements have different internal configurations, thereby differently altering the flow pattern of the fluids flowing therethrough.

17. The method according to claim 16, wherein independent differential measurements are provided by each of the differential pressure measuring flow elements.

18. The method according to claim 15, wherein each of the second and third flow elements is arranged to create a pressure drop to fluid passing therethrough.

* * * * *